United States Patent [19]

Heitkamp

[11] Patent Number: 4,956,217
[45] Date of Patent: Sep. 11, 1990

[54] SILICATE TREATED HONEYCOMB STRUCTURES

[75] Inventor: Richard R. Heitkamp, Long Beach, Calif.

[73] Assignee: Ciba-Geigy Corportion, Ardsley, N.Y.

[21] Appl. No.: 290,820

[22] Filed: Dec. 22, 1988

Related U.S. Application Data

[63] Continuation of Ser. No. 901,355, Aug. 28, 1988, abandoned.

[51] Int. Cl.$^5$ .............................................. B32B 3/12
[52] U.S. Cl. ..................................... 428/116; 52/806; 428/921
[58] Field of Search .................. 52/806; 156/197, 292; 428/116, 117, 118, 920, 921

[56] References Cited

U.S. PATENT DOCUMENTS

| Re. 31,960 | 7/1985 | Phillips | 428/458 X |
|---|---|---|---|
| 3,859,125 | 1/1975 | Miller et al. | 428/116 X |
| 3,905,775 | 9/1975 | Sowards et al. | 428/116 X |
| 3,923,940 | 12/1975 | Hujii et al. | 428/116 X |
| 3,930,085 | 12/1975 | Pasiuk | 428/116 |
| 3,999,040 | 12/1976 | Ellis | 428/116 X |
| 4,061,812 | 12/1977 | Gilwee, Jr. et al. | 428/117 |
| 4,122,236 | 10/1978 | Holman | 428/326 X |
| 4,251,579 | 2/1981 | Lee et al. | 428/73 |
| 4,299,872 | 11/1981 | Miguel et al. | 428/921 X |
| 4,421,827 | 12/1983 | Phillips | 428/458 |
| 4,569,878 | 2/1986 | Barrall et al. | 428/317.5 X |

FOREIGN PATENT DOCUMENTS

| 7823818 | 11/1978 | Fed. Rep. of Germany. | |
| 2239573 | 2/1975 | France. | |
| 1454493 | 11/1976 | United Kingdom | 428/920 |

*Primary Examiner*—Henry F. Epstein
*Attorney, Agent, or Firm*—Harry Falber

[57] ABSTRACT

A laminate structure comprising a honeycomb core structure and facing sheets bonded thereto, said core being treated with a silicate impregnant/coating to impart improved flame resistance and to reduce heat transmission and toxic emissions upon exposure of said core to direct or indirect heat, flame and/or pyrolytic environment.

10 Claims, No Drawings

SILICATE TREATED HONEYCOMB STRUCTURES

This application is a continuation, of application Ser. No. 901,355, filed Aug. 28, 1986, now abandoned.

Honeycomb cores have long been recognized as an excellent structural technique for stabilizing thin face sheets utilized in aircraft, marine and various transportation vehicle designs. Combined with rigid skin panels to form sandwich type structures, these constructions provide very high strength per unit of weight. The technical literature is replete with patents, articles, technical bulletins, and the like, directed to such honeycomb core constructions, including varied core and skin compositions, preparative methods, adhesive and resin formulations and the like.

Properties and characteristics of such constructions that have been of primary concern include mechanical strength, strength to weight relationship, peel strength, permanence of the adhesive bond between the core and the facing sheets, distortion resistance, and the like. The use of the core constructions in vehicles, particularly military vehicles, as well as in various static installations, such as housings for combustible substances, has also raised the need for core constructions which resist, prevent, damp or quell fires and which function as heat and flame barriers. The primary existing approaches for obtaining such properties have focused on appropriate formulation of the resins utilized to impregnate the core, on control of the resin content and on the use of various non-combustible materials as the core base. Other approaches have involved utilizing foam constructions as the honeycomb core and introducing fire-extinguishing fluids into the cells of the core. U.S. Pat. No. 4,061,812, U.S. Pat. No. 4,251,579 and British No. 1,454,493 disclose constructions which reflect some of these concepts. While these approaches have met with varying degrees of success, the resulting composite structures have generally not met existing standards required of heat and flame barriers including low flame penetration and substantially reduced smoke and toxicity generation and/or have had to sacrifice other properties particularly mechanical strength in order to arrive at an acceptable level of fire protection.

Accordingly, it is the primary object of this invention to develop a honeycomb composite structure exhibiting excellent heat and flame barrier properties as well as excellent mechanical strength.

It is a further object to provide such structures which overcome many of the disadvantages of the prior art materials.

It is still a further object to provide a diversity of constructions within the primary inventive concept which meet accepted industry and governmental standards.

Various additional objects and advantages of this invention will become apparent from the following descriptive material.

It has now been surprisingly discovered that by treating the honeycomb core with a sodium silicate solution until a prescribed amount is present on the core and then utilizing the treated core in the construction of a laminate structure with fiber reinforced laminate or metallic skins bonded to the core, composite structures with appropriate physical and performance characteristics are obtained. Of primary importance, the laminate structures function as excellent heat and flame barriers, providing improved resistance to heat transfer and burn-through. In addition, the laminate structure satisfies existing industry and governmental requirements for low flame penetration and substantially reduced levels of smoke and toxicity generation. Of further significance is the fact that the resulting laminate structure does not excessively reduce mechanical properties such as core peel and shear strength in order to exhibit the improved flame retardant performance. Accordingly, these composite structures can be beneficially utilized in a wide range of applications, such as in aircraft, marine and other transportation vehicles, as well as in static installations such as housings for combustible substances, engine box covers, exhaust coverings and the like.

It is also to be noted that the core can be treated with the silicate in a variety of ways while still obtaining the desired flame retardant properties. For example, the bare core may be coated and/or impregnated with the silicate solution or the silicate may be added over the organic resin preimpregnated core. In addition, the silicate may be added to the resin system utilized to impregnate the raw core material and introduced as part of the resin system. It is thus seen that there is significant flexibility in preparing the improved fire retardant composite structures of this invention.

The base materials which can be utilized to prepare the core component and methods for preparing the core are well known to those skilled in the act. The base material may be metallic or non-metallic with non-metallic cores being preferred, especially those of a woven or non-woven fibrous material. Representative base materials include aluminum; cellulosic papers; silica-based (quartz) mats, paper or fabrics; and mats, paper or fabrics made from organic materials such as carbon, graphite, aromatic polyamides, polyimides, polyetherimides, polysulfones, polyvinyl alcohol, vinyl copolymers, polyesters and polyolefins; and the like. The term "honeycomb core" as used herein includes, but is not limited to, cores having square, sinusoidal, rectangular, reinforced hexagonal, cylindrical, tubular or hexagonal cells. Core prepared from aromatic polyamides, polyetherimides and cellulosic fibers formed in a hexagonal configuration are preferred.

The sodium silicates are compositions in which sodium oxide and silica are combined in various proportions. As described hereinafter, the silicates may be utilized in dry, crystalline form, as an aqueous solution or as an aqueous colloidal suspension. Such silicates may be characterized by the formulae $Na_2SiO_3 \cdot x\, H_2O$ or $Na_2Si_4O_9 \cdot x\, H_2O$ with the ratio by weight of sodium oxide to silica ranging from about 1:4 to 1:1.5 with free water ranging from about 50 to 70%, by weight, and the anhydrous forms thereof. Although the term "sodium silicate" will be utilized herein, it is to be noted that this term includes sodium silicate, sodium metasilicate, sodium metasilicate pentahydrate, sodium tetrasilicate, sodium orthosilicate, and other comparable silicates whether in anhydrous or hydrated form and whether in dry or solution form. The preferred silicate solution is sodium silicate in a 3.22 silicate to sodium ratio in a 61.7% aqueous solution with a viscosity of about 206 centipoises.

As previously noted, the core material may be treated with sodium silicate in a number of ways. These approaches may be characterized as follows:

CORE DIP COATING SYSTEM

A dip tank containing the sodium silicate solution is prepared and the cured unsliced bare or resin preimpregnated core block is dipped in the solution. The block is then drained, dried in a forced air environment on a thermal curve from 65°-135° C. until the desired amount of free water is driven off. The block is then redipped, drained and redried. This process is repeated until the target density is reached or the thickness of coating is obtained. In each dip, the block is preferably reversed 180° in order to facilitate even distribution of the coating. The core is then sliced into sheets and processed as normal core. This system is valid for both block and presliced core sheets. If single sheets are processed, it is preferred to abraid the surfaces to remove the glaze, to facilitate bonding and to retain dimensional thickness. A practitioner may elect to select a bare unimpregnated core and dip it up with silicate to its required density or to add silicate coatings to a preimpregnated and cured standard core. It is also possible to use a combination of core preimpregnated with a light stabilizing wash primer coat of an organic resin, precured and silicate added to build density to the required levels. It is further possible to alternate dips between the organic resin and the silicate, adjusting the drying/curing cycles to accomodate the process, so as to retain mechanical properties at a level commensurate with a specific application.

CORE INTEGRAL SYSTEM

An organic resin solution is blended with the desired amount of dry sodium silicate as a percentage of base organic resin solids. A diluent is added to correct the viscosity to the desired range. The diluent may be a reactive or non-reactive diluent depending on the resin system and performance objective. Typical diluents include alcohol, water, aqueous-based phenolic resins, or combinations thereof. The expanded core block is then dipped in the solution, drained, cured to an intermediate temperature (65° to 135° C.) to drive off solvents and effect a partial cure. The block is reversed, redipped, drained and cured as before. The process is repeated until the desired density and/or resin content is obtained. The core block is then totally cured (135° to 220° C.) to reach the desired level of polymerization. The core may also be processed to what is termed a "Green" cure, which is less than full polymerization. "Green" cure core may be postformed during the fabrication or product manufacturing operation. Normally, flat panel fabrication requires a fully cured core, while complex contoured sandwich structures may employ a "Green" core to facilitate bending or contouring the core in fabrication.

A further but less preferred approach involves dipping the cured, resin impregnated core in the sodium silicate solution and draining and drying as above.

There are several optional steps which may be utilized with these various approaches in order to improve the uniformity of the coating as well as the physical and/or mechanical properties of the resulting composite structure. For example, closer control over variables such as coating solution solids content, viscosity, temperature, forced air velocity and dry/cure cycle, facilitate the production of uniformly coated constructions.

It is also preferred to dry and/or cure the sodium silicate coated or impregnated core in an oxygen-free carbon dioxide environment. This option, whether utilized after individual dips or during the final dry/cure/postcure cycle, serves to improve the physical and/or mechanical properties of the sodium silicate and, in turn, the final composite structure.

The concentration of sodium silicate in the resulting core structure is selected to provide an appropriate balance between fire retardant performance and mechanical properties. Typical values range from 20 to 90% of the final core density as the silicate component, preferably 60 to 80% and most preferably 70%. When introduced as an independent coating, it consists of from about 10 to 100%, by weight, of the resin coating. When added to the resin system, the silicate is generally added in a range of 15-50%, by weight, of resin solids, and preferably 20-35%.

The resin systems utilized to impregnate the core are well known to those skilled in the art. Typical resin systems are thermosetting and include epoxy resins and modified versions thereof, phenolic resins, polyimides, aramids, polyesters, ureas, melamines, bis-maleimides, and the like. Phenolic and epoxy resins are preferred for purposes of this invention.

A variety of optional ingredients may be utilized in conjunction with the sodium silicate treatment. These additives are selected in order to provide added and/or enhanced properties to the composite structure. They may be introduced as part of the sodium silicate solution or as independent pre- or post-treatments of the core. Typical additives include boron/borate base materials such as silicon-borate, borosilicates, boric acid; fire-extinguishing agents such as potassium and sodium bicarbonates, ammonium phosphates and potassium bicarbonate - urea products; various phenolic, urea or polyester-based resin systems; and various sugars and salts which alter viscosity, density, cohesion, adhesion, solubility and the like. These additives are introduced in the amounts needed to obtain the desired characteristic without adversely effecting the fire retardancy and mechanical properties of the resulting composite structure.

The facing sheets utilized in the composite structures of this invention are likewise known to those skilled in the art and generally are resin-impregnated fibers such as glass, carbon, Kevlar, cotton, and the like.

The adhesive utilized to bond the core to the facing sheets may be applied by any conventional method, such as by roller, by spray, by printing, or a solid film of adhesive may be used. The adhesive may be applied to the facing sheets, or to the cell edges, or to both. For discontinuous bonding, a liquid adhesive may be applied, through a screen or mask by spraying or printing, or there can be used a solid film adhesive having discrete holes over the entire bonding surface. The adhesive may be a thermoplastics material, or preferably, a thermosetting resin, such as a polyepoxide, polyurethane, and phenolic resin, or a mixture of a thermosetting resin and a thermoplastics material.

Construction of the laminate structure is accomplished by conventional existing technology. For example, after the individual dipping operations or after the laminate is assembled, the layers must then be subjected to controlled heat and pressure conditions to allow proper curing of the laminae. The core must be selected to be able to withstand the curing pressure, typically 40 p.s.i., and postcuring temperature without significant structural degradation. A three to four pound core is sufficient to withstand these manufacturing conditions. Curing occurs in a temperature and pressure controlled environment, such as an autoclave and is preferably proceeded by evacuating the local environment about the laminate assembly. Curing temperatures may vary from 105° to 315° C. Drawing a vacuum allows the air trapped within the uncured laminae to escape as the skin cures. Without a vacuum, internal voids, due to trapped air bubbles, are more likely to develop within the laminate.

One final option for supplementing the sodium silicate content involves subjecting the finished manufactured product to a dip coating of sodium silicate solution. Such a process will provide a surface sealant and flame barrier on the finished product. The dry cycle is similar to previous cycles, i.e., 65°-135° C. on a controlled gradient.

As previously noted, the resulting fire retardant composite structures can be utilized in a variety of applications including aircraft, marine or other transportation vehicles, especially military vehicles, and for static installations including housings for combustible substances and protective barriers. These structures provide excellent heat and flame resistance and allow for desirable low levels of flame penetration, smoke generation and toxic fume discharge. In addition, they may be tailored to exhibit appropriate mechanical properties for specific and predetermined applications.

The following examples further illustrate the embodiments of this invention. In these examples all parts given are by weight unless otherwise noted.

EXAMPLE I

This example illustrates the preparation of composite structures representative of this invention.

Base Core Materials Employed

A. Aromatic polyamide paper hexagonal cell base core, phenol-formaldehyde resin impregnated, density 1.8#/cu. ft-1.8" cell size. B. Polyetherimide extruded tubular cell base core, polyetherimide resin impregnated, density 4.1#/cu. ft.-3/16" cell size.

Sodium Silicate Base Solution Employed (base silicate—3.22 ratio, 9.1% Na₂O to 29.2% SiO₂ in 61.7% H₂O).

The base solution was further reduced to a 15% solids solution with H₂O to adjust viscosity for purposes of dipping. Dipping/drying treating approach was utilized with drying cycle being 10 minutes at 65° C., 10 minutes at 107° C. and 20 minutes at 135° C. The densities after silicate treatment were:

|  | Untreated (lbs./cu. ft.) | Silicate Treated (lbs./cu. ft.) |
|---|---|---|
| A | 1.8 | 5.0 |
| B | 4.1 | 6.0 |
| Control A[1] | 5.01 | — |
| Control B[2] | 4.3 | — |

[1] Control A identical in composition to core A except for increased density.
[2] Control B identical in composition to core B except for increased density.

EXAMPLE II

The flame retardancy of the treated and untreated cores was determined by means of Federal Test FAR 25.853 Vertical burn and 45° burn test conditions were utilized. The exposure times for the silicate treated cores were twice the test specification value for the vertical burn procedure and four times the test specification value for the 45° burn procedure as contrasted to the control cores which were exposed for the prescribed times in order to further highlight the performance features of the instant systems. Evaluation was based on a visual determination of depth of burn, char mass and smoke generation. "Pass" indicates that the exposed sample exhibits no more than a prescribed damage level. The results were as follows:

|  | Control | | Silicate Treated | |
|---|---|---|---|---|
|  | A | B | Core A | Core B |
| Vertical burn | Pass | Fail | Pass* | Pass |
| 45° burn | Pass | Fail | Pass** | Pass |
| Smoke level | Excessive | Excessive | Minor | Minor |

*Exhibited only 56% of the damage observed in Control A
**Total absence of burn damage as contrasted to threshhold level of damage in Control A These data clearly indicate the fire retardant benefits of the instant cores.

EXAMPLE III

Each of the cores prepared in Example I was press bonded on each surface thereof with precured two-ply 0/90 unidirectional epoxy resin impregnated fiberglass skins. The adhesive was a modified epoxy resin.

The mechanical properties of these composite structures, including controls, were determined according to the procedures in Federal Standard 401. The results were as follows:

|  | Control | | Silicate Treated | |
|---|---|---|---|---|
|  | A | B | Core A | Core B |
| Panel Shear (lbs.) | 531 | 380 | 396 | 418 |
| Panel Compression (lbs.) | 871 | 411 | 390 | 421 |

EXAMPLE IV

The ability of the composite structure to retard or prevent burn through was determined by the Horizontal Burn Through Test. In this test, the specimen is positioned horizontally and a flame is brought to the underside of the specimen until it just impinges on the surface of the lower skin. In this instance, the calibrated flame temperature at the point of impingement without specimen in place was 982° C. One thermocouple is placed in the flame at the point of impingement, while two thermocouples are placed directly opposite on the top side of specimen. Temperature rise rate is plotted on a time/temperature recorder chart.

The specimen was a polyetherimide core sandwich, 0.50 inches thick, prepared as in Example III with 2-ply high tensile strength 0/90 unidirectional glass and epoxy resin skins.

Test Results:

Untreated standard sandwich panel (PEI core-4.2 lbs./cu. ft. density)

A 372° C. backside rise in temperature in 1.4 minutes (266° C./min. rise rate) was observed with a total loss of core. Smoke generation from the core and skin resin was extensive.

Silicate treated core sandwich panel (PEI core–9.0 lbs./cu. ft. density)

A 158° C. backside rise in temperature in 7.5 minutes (21° C./min. rise rate) was observed with no burn through or core loss. Smoke was generated only from the skin resin.

Correlating these results on the basis of equivalent density indicates a temperature rise rate of 63° C./pound density for the untreated panel as contrasted to only a rate of 2.3° C./pound density for the treated panel. These values plus the observations on smoke generation clearly illustrate the beneficial performance characteristics of the structures of this invention.

EXAMPLE V

This example illustrates the preparation of additional composite structures of this invention.

Cores

C—Aromatic polyamide paper hexagonal cell base core
(4 lbs. per cubic foot density)
D—Polyetherimide with hexagonal cells
(3.5 lbs. per cubic foot density)
E—Aluminum metal with hexagonal cells
(8.1 lbs. per cubic foot density)

Silicate Solution (28.5% solids in water) 300 parts aqueous sodium silicate solution—38.3% solids (base silicate has a 3.22 weight ratio with 9.1% $Na_2O$ to 29.2% $SiO_2$) plus 100 parts water Each of the core sections was dipped twice into the silicate solution and dried between dippings according to the following temperature sequence:
65° C.-30 minutes
93° C.-30 minutes
120° C.-30 minutes
135° C.-30 minutes Core C was coated to a 6 lb. per cubic foot density; Core D to a 5.5 lb. per cubic foot density, and Core E to a 10 lb. per cubic foot density.

Each of the processed cores was press bonded on each surface thereof with precured two-ply undirectional phenol-formaldehyde resin impregnated fiberglass skins. The adhesive was based on epoxy resin and applied at a 1.6 kg/m² weight.

EXAMPLE VI

The flame retardancy of each of the composite structures in Examples III and V was then tested by means of Federal Test FAR 25.853 at vertical and 45° burn. Upon being subjected to this flame test, each of the composite structures of this invention quelled the flame, resisted the spread of the fire, showed low smoke generation and substantially maintained the integrity of the core structure. In contrast, the controls which represented comparable but untreated composite structures exhibited significant spread of the flame and smoke generation as well as destruction of the core/facing sheet structure.

EXAMPLE VII

The mechanical properties of the composite structures prepared in Example V and of the appropriate controls were then determined according to Federal Standard 401, with the units for each of the tests being in pounds.

The results were as follows:

|  | Core C Composite | | Core D Composite | |
|---|---|---|---|---|
|  | Control | Treated | Control | Treated |
| Panel Shear | 355 | 481 | 247 | 429 |
| Long Beam | 300 | 356 | — | 300 |
| Core Peel | 30 | 30 | 20 | 20 |
| Panel Compression | 546 | 679 | 258 | 437 |
| Core Compression | 265 | 490 | 239 | 355 |

The data in these examples thus indicate the excellent flame retardant properties and the acceptable mechanical properties of the treated composite structures of this invention, said balance of properties being particularly significant inasmuch as prior art systems have generally had to sacrifice mechanical properties in order to improve flame retardance.

Summarizing, this invention is seen to provide composite structures with treated honeycomb core components such as to provide flame retardance and acceptable mechanical properties to said structures. Variations may be made in procedures, proportions and materials without departing from the scope of the invention as defined by the following claims.

What is claimed is:

1. In a honeycomb-laminate composite structure comprising a cellular core and a facing sheet bonded to at least one face of the core, the improvement which provides flame retardant properties thereto comprising a cellular core substantially completely coated and/or impregnated with an effective fire retarding amount of a sodium silicate.

2. The composite structure of claim 1, wherein said core is impregnated with a thermosetting resin.

3. The composite structure of claim 2, wherein said sodium silicate is present as an independent coating layer.

4. The composite structure of claim 2, wherein dry sodium silicate is present in the thermosetting resin utilized to impregnate said core.

5. The composite structure of claim 1, wherein said facing sheet is a fiber reinforced material impregnated with a thermosetting resin.

6. The composite structure of claim, 1, wherein the silicate content is from 20 to 90% of the final core density.

7. The composite structure of claim 3, wherein the silicate is present in from about 10 to 100%, based on the weight, of the resin.

8. The composite structure of claim 4, wherein the silicate is present in an amount of 15 to 50%, by weight, of resin solids.

9. The composite structure of claim 1, wherein a thermosetting, thermoplastic or combined thermosetting-thermoplastic adhesive is utilized to bond the facing sheet to the core.

10. The composite structure of claim 1, wherein said sodium silicate has a weight ratio of sodium oxide to silica ranging from 1.5 to 4.0.

* * * * *